(12) United States Patent
Gundavelli et al.

(10) Patent No.: US 9,397,940 B2
(45) Date of Patent: Jul. 19, 2016

(54) SYSTEM AND METHOD FOR PROVIDING A TRANSLATION MECHANISM IN A NETWORK ENVIRONMENT

(71) Applicant: CISCO TECHNOLOGY, INC., San Jose, CA (US)

(72) Inventors: Srinath Gundavelli, San Jose, CA (US); Frank Brockners, Cologne (DE); Mark Grayson, Maidenhead (GB); Kent K. Leung, Palo Alto, CA (US); Flemming S. Andreasen, Marlboro, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/180,379

(22) Filed: Feb. 14, 2014

(65) Prior Publication Data
US 2014/0169374 A1 Jun. 19, 2014

Related U.S. Application Data

(63) Continuation of application No. 12/848,141, filed on Jul. 31, 2010, now Pat. No. 8,687,631.

(60) Provisional application No. 61/252,353, filed on Oct. 16, 2009.

(51) Int. Cl.
*H04L 12/28* (2006.01)
*H04L 12/56* (2006.01)
(Continued)

(52) U.S. Cl.
CPC .......... *H04L 45/741* (2013.01); *H04L 12/4633* (2013.01); *H04L 29/12367* (2013.01);
(Continued)

(58) Field of Classification Search
CPC .. H04L 12/5695; H04L 47/824; H04L 47/825
USPC .................................................. 370/338, 389
See application file for complete search history.

(56) References Cited

U.S. PATENT DOCUMENTS

2002/0046404 A1\* 4/2002 Mizutani .............. G11B 27/002
725/58
2003/0039212 A1\* 2/2003 Lloyd ................. H04L 12/2602
370/235

(Continued)

FOREIGN PATENT DOCUMENTS

| EP | 2489171 | 7/2013 |
| WO | WO 2009/116945 | 9/2009 |
| WO | WO 2011/046730 | 4/2011 |

OTHER PUBLICATIONS

Bagnulo, M., et al., "Stateful NAT64: Network Address and Protocol Translation from IP v6 Clients to IPv4 Servers," Oct. 10, 2009, 41 pages; http://tools.ietf.org/html/draft-ietf-behave-v6v4-xlate-stateful-02.pdf.

(Continued)

*Primary Examiner* — Wanda Z Russell
(74) *Attorney, Agent, or Firm* — Patent Capital Group (57) ABSTRACT

An example method is provided and includes receiving a packet associated with a flow, determining a tunnel identifier for the flow, and determining a flow identifier for the flow. The method includes associating the flow identifier and the tunnel identifier to an Internet protocol (IP) address to generate a binding to be used for a network address and port translation (NAPT). In other embodiments, a routing decision is executed based on the binding between the identifiers and the IP address. The flow identifier can be a context identifier (CID), and the tunnel identifier can be a softwire tunnel ID. In yet other embodiments, the packet can be tagged as part of an encapsulation operation, which includes providing information about a network location at which the network address and port translation is to be executed.

17 Claims, 9 Drawing Sheets

(51) Int. Cl.
 *H04L 12/46* (2006.01)
 *H04L 29/12* (2006.01)
 *H04L 29/06* (2006.01)

(52) U.S. Cl.
 CPC ........ *H04L29/12377* (2013.01); *H04L 61/106* (2013.01); *H04L 61/2514* (2013.01); *H04L 61/2517* (2013.01); *H04L 69/22* (2013.01)

(56) References Cited

U.S. PATENT DOCUMENTS

| | | | | |
|---|---|---|---|---|
| 2004/0037279 | A1* | 2/2004 | Zelig | H04L 12/1836 370/390 |
| 2005/0039040 | A1* | 2/2005 | Ransom | G01R 22/066 726/6 |
| 2006/0153230 | A1* | 7/2006 | Miyata | H04L 29/12066 370/466 |
| 2007/0070958 | A1* | 3/2007 | Rinne | H04W 12/06 370/338 |
| 2007/0248085 | A1 | 10/2007 | Volpano | |
| 2009/0232009 | A1* | 9/2009 | Finkelstein | H04L 12/66 370/248 |
| 2011/0090815 | A1 | 4/2011 | Gundavelli et al. | |

OTHER PUBLICATIONS

Baker, F., et al., "Framework for IPv4/IPv6 Translation," May 18, 2010; 31 pages; http://tools.ietf.org/html/draft-ietf-behave-v6v4-framework-09.pdf.

Brockners, F., et a., "Diameter Network Address and Port Translation control Application," Internet Engineering Task Force, Jul. 12, 2010, 41 pages; http://tools.ietf.org/html/draft-ieft-dime-nat-control-03.pdf.

Brockners, H., et al., "Gateway Inflated Dual-Stack Lite Deployment," Internet Engineering Task Force; Oct. 13, 2009, 22 pages; http://tools.ietf.org/pdf/draft-gundavelli-softwire-gateway-init-ds-lite-00.pdf.

Brockners, H., et al., "Gateway Initiated Dual-Stack Lite: Status Update," 3GPP-EITF Workshop Outcome, Mar. 1-2, 2010, 5 pages; http://tools.ietf.org/html/draft-gundavelli-softwire-gateway-ini-ds-lite-03.

Bush, R., "The A+P Approach to the IPv4 Address Shortage," Network Working Group, Jul. 14, 2009; 32 pgs.; http://tools.ietf.org/html/draft-ymbk-aplusp-04.

Durand, A., "Dual-Stack Lite Broadband Deployments Following IPv4 Exhaustion," Internet Engineering Task Group; Jul. 10, 2010; 36 pages; http://tools.ietf.org/html/draft-ietf-softwire-dual-stack-lite-05; 36 pgs.

Huang, B., et al., "Prefix NAT: Host based IPv6 translation," Network Working Group, Jul. 13, 2009; 24 pages; http://tools.ietf.org/html/huang-pnat-host-ipv6-01.

PCT Dec. 9, 2010 Notification of the International Search Report and the Written Opinion of the International Search Authority, or the Declaration for PCT/US2010/050201; 9 pages.

PCT Apr. 17, 2012 International Preliminary Report on Patentability for PCT/US2010/050201; 6 pages.

Srisuresh, P. et al., "IP Network Address Translator (NAT) Terminology and Considerations," Network Working Group RFC 2663, Aug. 1999, 31 pages; http://tools.ietf.org/html/rfc2663.

Townsley, W.M., "Layer Two Tunneling Protocol L2TP," Network Working Group, RFC 2661, Aug. 1999, 81 pages; http://tools.ietf.org/pdf/rfc2661.pdf.

PRC Feb. 19, 2014 SIPO First Office Action from Chinese Application No. 201080046524.

PRC Nov. 19, 2014 SIPO Second Office Action from Chinese Application No. 201080046524.

\* cited by examiner

| SOFTWARE-TUNNEL ID/<br>CONTEXT - Id / IPv4 / PORT | PUBLIC IPv4 / PORT |
|---|---|
| SOFTWARE-TUNNEL/<br>ID-1/CID-1/a.b.c.d/TCP PORT1 | e.f.g.h/TCP PORT2 |
| SOFTWARE-TUNNEL/<br>ID-2/CID-2/a.b.c.d/TCP PORT3 | e.f.g.h/TCP PORT4 |

| TUNNEL MODE | IPv4 ADDRESS | | | | NETWORK-TYPE | | | |
|---|---|---|---|---|---|---|---|---|
| | up | op | nm | s | v4 | v6 | v4v6 | MPLS |
| GRE WITH GRE-KEY | x | x | x | x | x | x | x | |
| MPLS VPN | x | x | x | | | | | x |
| PLAIN IP-in-IP | x | | x | | x | x | x | |

FIG. 15 ated with the communication system;

SYSTEM AND METHOD FOR PROVIDING A TRANSLATION MECHANISM IN A NETWORK ENVIRONMENT

RELATED APPLICATION DATA: CLAIMING PRIORITY TO A PROVISIONAL

This Application claims priority under 35 U.S.C. §119 of provisional application Ser. No. 61/252,353, filed Oct. 16, 2009 and entitled: GATEWAY INITIATED DUAL-STACK LITE, which is hereby incorporated herein by reference in its entirety.

This Application is a continuation (and claims the benefit of priority under 35 U.S.C. §120 of U.S. application Ser. No. 12/848,141, filed Jul. 31, 2010, entitled "SYSTEM AND METHOD FOR PROVIDING A TRANSLATION MECHANISM IN A NETWORK ENVIRONMENT," Inventors Srinath Gundavelli, et al. The disclosure of the prior application is considered part of (and is incorporated by reference in) the disclosure of this application.

TECHNICAL FIELD

This disclosure relates in general to the field of communications and, more particularly, to providing a translation mechanism in a network environment

BACKGROUND

Network communications are increasingly ubiquitous in our society. Various protocols have been developed to assist with communications integration. One such example of a protocol is Internet Protocol (IP) Version 4 (IPv4). However, IP addresses have become scarce in IPv4 pools such that IP Version 6 (IPv6) has been defined to increase the number of IP addresses. IPv6 continues to be introduced into communication systems, but IPv4 exists in many legacy architectures. There can be issues with upgrading from IPv4 to IPv6, or compatibility issues regarding communications between IPv4 and IPv6. In networks in which network address and port translation occurs, the lack of private address space and address exhaustion remains an issue. One objective in many such network environments might be to allow the network to migrate to IPv6-only, while allowing IPv4-only or dual-stack nodes to exist in the network (and to continue to access IPv4 internet services). As a general proposition, compensating for address issues, without sacrificing performance, presents a significant challenge to equipment vendors, network operators, and system designers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes receiving a packet associated with a flow, determining a tunnel identifier for the flow, and determining a flow identifier for the flow. The method includes associating the flow identifier and the tunnel identifier to an Internet protocol (IP) address to generate a binding to be used for a network address and port translation (NAPT).

In other embodiments, a routing decision is executed based on the binding between the identifiers and the IP address. The flow identifier can be a context identifier (CID), and the tunnel identifier can be a softwire tunnel ID. In yet other embodiments, the packet can be tagged as part of an encapsulation operation, which includes providing information about a network location at which the network address and port translation is to be executed.

The binding can be used to assign an external IP address for subsequent packets associated with the flow, and the external IP address can be an IP version 4 (IPv4) address. Subsequent packets can be forwarded to an access device using a CID and a softwire tunnel ID within the binding. In more specific embodiments, incoming packets can be evaluated in order to determine if the packets qualify for the network address and port translation. If the packets qualify for the network address and port translation, then the binding is generated. In other instances, tunnel identifiers and flow identifiers are not determined for flows associated with Internet protocol version 6 (IPv6).

Example Embodiments

Figure 1:
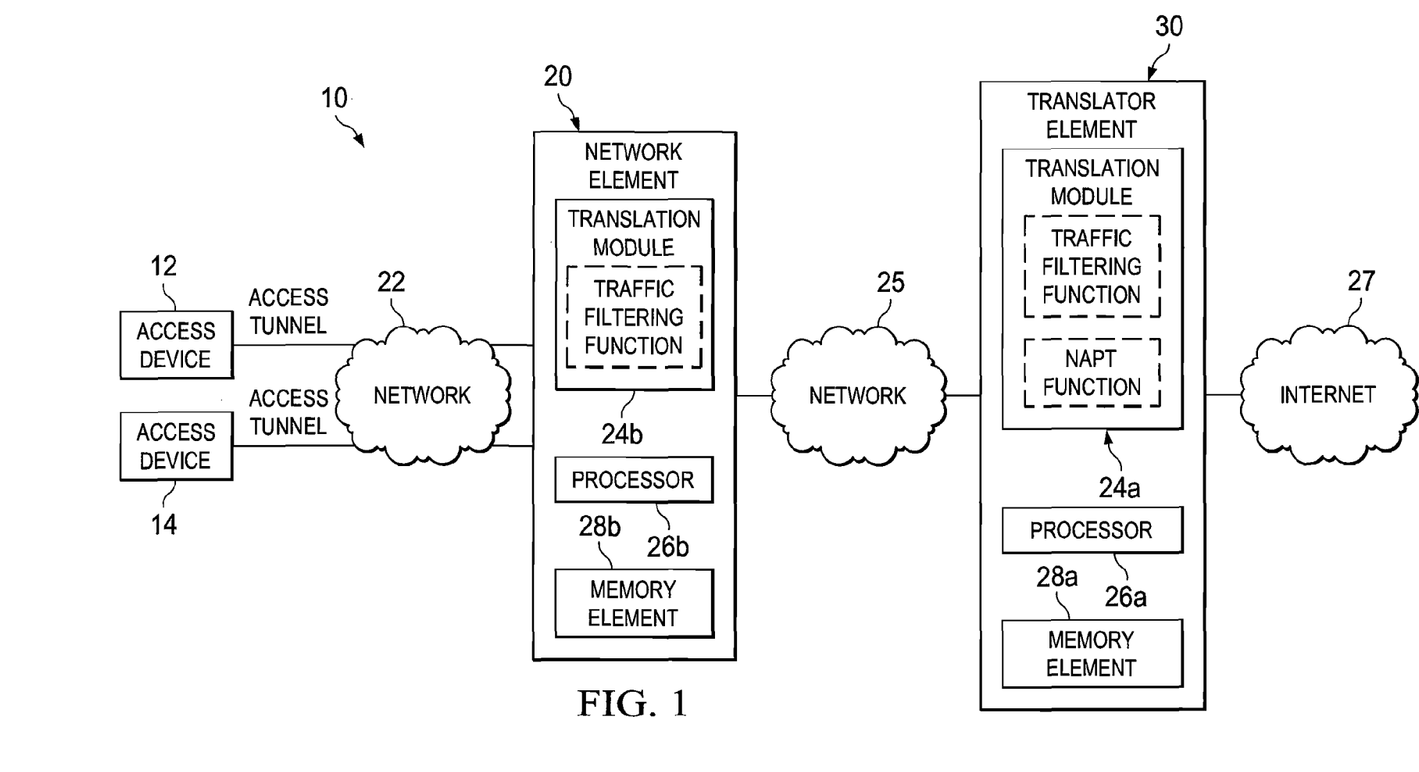
FIG. 1 is a simplified block diagram illustrating a communication system for address management in a network environment in accordance with one embodiment of the present disclosure.

Turning to FIG. 1, FIG. 1 is a simplified block diagram of a communication system 10 for translation management in a network environment in accordance with one embodiment of the present disclosure. Communication system 10 includes multiple access devices 12, 14. A network 22 can be coupled to access devices 12, 14 and a network element 20. In some embodiments, a first access tunnel (e.g., having an access tunnel identifier (ID) (ATID)-1 and a second access tunnel ID (e.g., ATID-2) can be instantiated across network 22: between access devices 12, 14 and network element 20. Network element 20 can also be coupled across a network 25 to a translator element 30, which (in one embodiment) can include various aspects of a network address and port translation (NAPT) mechanism, an Address Family Transition Router (AFTR), or similar devices with potentially analogous functionality. Translator element 30 can be coupled to an Internet 27, which can facilitate subsequent communications access devices 12, 14.

Note that network operators are challenged by IPv4 address exhaustion issues. IPv6 does offer a viable solution to this scarcity problem, but there are still legacy devices in the network that need to be accommodated. In accordance with one example embodiment, communication system 10 can offer enhancements in various locations of the network to resolve these address coordination issues. A change can be made to a first hop IP gateway (e.g., network element 20), where the architecture is provisioned to selectively extend existing tunnels (e.g., defined between access devices and gateways) to a next destination associated with a network address and port translation (e.g., translator element 30).

Hence, with an end-to-end tunnel, the architecture can forward/route traffic based on tunnel identifiers (e.g., the context identifier (CID) and the softwire-tunnel ID). This would be in contrast to simple routing that would be based on IPv4 exclusively. Similarly, on translator element 30, the tunnel identifiers can be associated with the bindings. From this location, an external IP address is systematically being assigned, while internally the IPv4 address is no longer needed to identify the bindings. (Note that in terms of the nomenclature used herein, the term 'softwire ID' (SID) was formerly used for flow identification, whereas a more current (and broader) term 'context ID' (CID) is used herein. The context ID can be used to identify one or more flow characteristics for any particular flow in the network. Similarly, the term 'softwire tunnel ID' (STID) identifies one or more tunnel characteristics for any tunnel in the network. An internal portion of a binding can be identified by (at least) the STID, or the CID, or the port, etc. Along similar lines, the terms Carrier Grad NAPT (CGN), AFTR, digital subscriber line tunnel concentrator (DSLTC), and DSLTC/large scale NAPT (LSN) can be represented by the broad term 'translator element' as used herein in this Specification.)

Typically, bindings are identified between two types of IP addresses (e.g., an internal address and an external address involving IPv4). In contrast, embodiments of communication system 10 allow for that binding to involve an IP address and a set of identifiers (e.g., a softwire tunnel ID and a context ID (which is a form of a flow identifier)). In essence, the IPv4 address is being replaced by tunnel identifiers at translator element 30 such that the architecture can render the (otherwise problematic) IPv4 address irrelevant (from a network perspective). This may be the case with GRE encapsulation, where for plain IP-in-IP (in addition to IP-in-MPLS), the IPv4 address would still be meaningful because it can be used as the CID. Note that such strategies can afford a network service provider considerable flexibility in liberating the private address domain. For example, such a strategy could allow for more than 16 M endpoints and/or relieve the operator from IPv4 address management on the endpoints (e.g., if desired, all endpoints could have the same IPv4 address). It should also be noted that such a strategy has broad applicability because it can accommodate any type of access network. In more specific implementations, certain approaches outlined herein simply allow the same IPv4 address to be allocated to multiple IP hosts behind a given translator element (which can take any suitable form), where such an allocation would resolve IPv4 address exhaustion issues.

Operationally, and from the perspective of network element 20, as a new packet arrives, a filtering function can be employed to determine if this particular packet (and, thereby, the flow associated with this particular packet) should be NAPT-ed in some fashion. In this sense, only selected flows are being targeted for a network address and port translation. For example, certain IPv6 flows would not be subjected to a network address and port translation. For this new flow, a softwire tunnel ID and a context ID can be allocated, where information can be provided as to where the flow should be routed for purposes of performing a NAPT. For example, the packet could be tagged accordingly, where this could be part of the encapsulation activities before the packet is sent across the network to any suitable next destination (e.g., translator element 30).

The operations are similar from the perspective of translator element 30. The packet can be received and the external portion of the NAPT binding can be readily identified. This identification can occur based on the context ID and the softwire tunnel ID. In a general sense, the NAPT can now be conducted between a set of identifiers and an external IP address and port. This is in contrast to a NAPT operation associated with two IP addresses. Hence, the context ID and the softwire tunnel ID are being used to make routing decisions toward any suitable next destination. In one particular embodiment, forwarding logic can be modified to use the softwire tunnel ID and the context ID to perform routing decisions (e.g., forwarding).

Thus, a tunnel (e.g., an access tunnel) can be effectively extended for those flows needing NAPT from network element 20 to translator element 30, as well as between network element 20 and access devices 12, 14. Examples of a tunnel protocol that can be extended include IPv4-over-GRE-over-IPv4, IPv4-over-GRE-over-IPv6, etc. Network element 20 can be designed to serve a large number of access devices. Before turning to particular flows associated with communication system 10, it may be useful to understand certain IP addressing aspects of communications in a packet network. The following foundational information may be viewed as a basis from which the present disclosure may be properly explained.

Generally, there is a limitation on the total number of IPv4 addresses, which are available to a service provider. Furthermore, there can be other considerations, such as network security, which can be a consideration in implementing an address management scheme. Typically, a translator device of a communication network translates and forwards packets bi-directionally to end-user devices within the communications network. IPv4 addresses can be different from what is seen as the IPv4 address of the end-user devices. Compatibility issues can quickly surface such that an appropriate translation mechanism should be provided for the architecture.

In accordance with one particular example implementation, network element 20 can be configured to include a translation module 24b. Translation module 24b can perform various activities such as filtering packets in order to determine whether a flow should be subjected to NAPT-ing and binding operations. Note that to highlight a more common implementation associated with the present disclosure, translation module 24b of FIG. 1 includes a traffic filtering function (shown as a hatched box), while translation module 24a can include the same function along with a NAPT function (also shown as a hatched box). The operations of these components may also include determining various identifiers. Furthermore, each flow can have its own identifier, such as a context identifier (CID), which may be used to multiplex flows associated with individual access devices of an access tunnel. [Note that the CID can be viewed as a type of flow identifier. When a context is created for a flow, it is assigned a unique ID (e.g., a number indicative of the CID)]. Both the softwire tunnel ID and the CID can then be used by translator element 30 to bind an outer IPv4 address to an inner IPv4 address (if they are not already bound), and can otherwise forward traffic through translator element 30.

Generally, translator element 30 can leverage IPv4-over-GRE-over-IP tunnels (or other tunneling modes) for carrying IPv4 traffic from network 22 to translator element 30, which can perform any number of functionalities of an AFTR, a CGN, a DSLTC/LSN, and/or analogous devices. An established tunnel between translator element 30 and access devices 12, 14 can then be used for traffic forwarding purposes. Note that the term 'softwire tunnel' refers to any type of tunneling mechanism between translator element 20 and network element 20.

The translation approach of translator element 30 enables a service provider to share public IPv4 addresses among different customers, such as different access devices 12, 14. Such a strategy can result in supporting overlapping IPv4 addresses in an access network: requiring virtually no changes either to the access device, or to the access network architecture. In another embodiment, packets of the extended tunnels may also include mechanisms for carrying context state relating to the encapsulated traffic (e.g., identified by the context ID). Advantageously, if for example, a GRE-based encapsulation with GRE-key extensions were chosen, this would allow network 25 (between network element 20 and translator element 30) to be either provisioned as an IPv4 or an IPv6 system. This affords a service provider the opportunity to migrate to IPv6 in incremental steps. Generally, FIG. 1 outlines one embodiment of a deployment scenario that can be applied or mapped to various different access architectures: some of which are described with reference to FIGS. 9-15.

As discussed above, the CID can be used to multiplex flows associated with the individual access devices onto a softwire tunnel. A CID may be used to identify an individual multiplex flow. In one embodiment, local policies at network element 20 determine which part of the traffic received from an access device is tunneled to translator element 30. Stated differently, network element 20 filters traffic to determine whether the traffic is to be directed to translator element 30, where this can be based on such considerations as whether an address binding for a particular address device has occurred. In one embodiment, the CID is a 32-bit identifier, which can be assigned by network element 20. It can be retrieved from either a local or a remote repository (e.g., an Authentication, Authorization, and Accounting (AAA) server/database (not illustrated in FIG. 1)). Generally, the flow identifier (e.g., the CID) can ensure a unique identification for the flow, and may potentially be provided along with other traffic identifiers such as an interface identifier, a virtual local area network (VLAN) identifier, a port identifier, a virtual private network (VPN) identifier, a VPN routing and forwarding (VRF) identifier, etc. The particular application of the CID and the softwire tunnel ID employed can depend on the tunnel mode used and/or the type of the network connecting network element 20 and translator element 30. In one embodiment, the combination of a CID and a softwire tunnel serves to identify traffic associated with an access device, and which propagates between network element 20 and translator element 30.

If, for example, GRE with GRE key and sequence number extensions is used as a tunneling technology, network 25 (connecting network element 20 and translator element 30), could be IPv4-only, IPv6-only, or an IPv4 and IPv6 hybrid network. The CID could be carried within the GRE-key field in particular embodiments presented herein.

Translator element 30 can combine tunnel termination and IPv4-IPv4 NAPT. The outer/external IPv4 address of a NAPT-binding at translator element 30 can be assigned: a) autonomously by translator element 30 from a local address pool; b) configured on a per-binding basis (such as either by a remote control entity through a NAPT control protocol, or through manual configuration); or c) derived from the CID (e.g., the 32-bit CID could be mapped 1:1 to an external IPv4 address). In some embodiments, the choice of the appropriate translation scheme for a traffic flow can account for parameters such as destination IP address, incoming interface, etc. The IP address of translator element 30 can be provided to network element 20, where the IP address can be either an IPv6 address or an IPv4 address. A variety of methods such as out-of-band mechanisms or manual configuration can apply in certain instances. Translator element 30 can optionally be co-located with network element 20, but more typically, these two elements are not coincident.

In one example implementation, network element 20 and/or translator element 30 include software, hardware, and/or firmware (e.g., as part of translation modules 24a, 24b, where these modules can be provisioned in any fashion) to achieve the tunneling, identifying, and/or binding operations, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these traffic management operations.

Before turning to additional operations of communication system 10, a brief discussion is provided about some of the infrastructure of FIG. 1. As illustrated in FIG. 1, each of translator element 30 and network element 20 include a respective translation module 24a, 24b, a respective processor 26a, 26b, and a respective memory element 28a, 28b. Network element 20 and translator element 30 can also include suitable interfaces for receiving and/or transmitting data. Various elements and aspects of communication system 10 can readily interact with each other in order to exchange routing data, tunneling data, commands, etc.

Generally, access devices 12, 14 are representative of devices that can be used in communication environments (e.g., being tunneled to or from, or otherwise managed using network communications). The term "access device" is inclusive of devices used to initiate a communication, such as a computer, a router, a gateway, a switch, a personal digital assistant (PDA), a laptop or electronic notebook, a Webcam, a wireless access point, a residential gateway, a modem, a cellular telephone, a subscriber, a mobile node, user equipment of any kind, an iPhone, an IP phone, a digital video recorder, a camera, or any other device, component, element, or object capable of initiating or facilitating voice, audio, video, media, or data exchanges within communication system 10. Access devices 12, 14 may also be inclusive of a suitable interface to the human user, such as a microphone, a display, or a keyboard or other terminal equipment. Access devices 12, 14 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Network element 20 and translator element 30 are network elements that can be used by service providers to manage (or that cooperate with each other in order to manage) tunneling and routing in a network environment. As used herein in this Specification, the term "network element" is meant to encompass routers, switches, gateways, bridges, loadbalancers, firewalls, applications, application program interfaces (APIs), inline service nodes, proxies, servers, processors, modules, or any other suitable device, component, element, or object operable to exchange information in a network environment. The term "translator" is meant to encompass, among other things, NAPT, Carrier Grade NAPT, Large Scale NAPT, and AFTRs, or other devices or systems that offer analogous services and/or translation features. The network element or translator element may include any suitable hardware, software, components, modules, interfaces, or objects that facilitate the operations thereof. This may be inclusive of appropriate algorithms and communication protocols that allow for the effective exchange (reception and/or transmission) of data or information.

Networks 22, 25 represent a series of points or nodes of interconnected communication paths for receiving and transmitting packets of information that propagate through communication system 10. Networks 22, 25 can offer a communicative interface between network elements, devices, etc. and may be any local area network (LAN), wireless LAN (WLAN), metropolitan area network (MAN), wide area network (WAN), extranet, Intranet, a virtual private network (VPN), virtual LAN (VLAN), or any other appropriate architecture or system that facilitates data propagation in a network environment. Networks 22, 25 can support a transmission control protocol (TCP)/IP, or a user datagram protocol (UDP)/IP in particular embodiments of the present disclosure; however, networks 22, 25 may alternatively implement any other suitable communication protocol for transmitting and receiving data packets within communication system 10. Networks 22, 25 can foster various types of communications and, further, can be replaced by any suitable network components for facilitating the propagation of data.

Note that access devices 12, 14, network element 20, and/or translator element 30 may share (or coordinate) certain processing operations. Furthermore, their respective memory elements may store, maintain, and/or update data in any number of possible manners. Additionally, because some of these network elements can be readily combined into a single unit, device, or server (or certain aspects of these elements can be provided within each other), some of the illustrated processors may be removed, or otherwise consolidated such that a single processor and/or a single memory location could be responsible for certain activities associated with traffic management controls. In a general sense, the arrangement depicted in FIG. 1 may be more logical in its representations, whereas a physical architecture may include various permutations/combinations/hybrids of these elements. Details relating to the possible signaling and interactions between the components of communication system 10 are provided below with reference to FIGS. 2-15.

Figure 2:
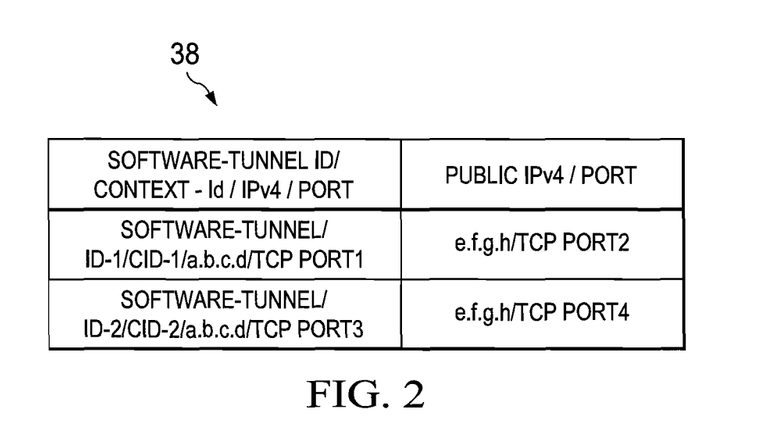
FIG. 2 is a simplified table associated with the communication system in accordance with one embodiment of the present disclosure.

Turning to FIG. 2, FIG. 2 is a simplified block diagram that illustrates an example of a translation table 38 that can be located at translator element 30. More specifically, FIG. 2 can be representative of a software state of translator element 30. In one embodiment, a NAPT binding entry can be maintained at translator element 30 and, further, reflect an active flow for an access device of communication system 10. The binding mechanism can be extended to include (at least) two other parameters: the CID and the softwire tunnel ID (STID). When creating an IPv4-to-IPv4 NAPT binding for an IPv4 packet flow (received at translator element 30 from network element 20 over a softwire tunnel), translator element 30 can associate the CID with that NAPT binding. Translator element 30 can use the combination of the CID and the softwire tunnel identifier as the unique identifier and, further, store this in a NAPT binding entry. In other embodiments, network element 20 and translator element 30 can have multiple softwire tunnels established between them (e.g., to separate address domains, provide for load-sharing, etc.).

In one embodiment, when forwarding a packet to access device 12, 14, translator element 30 obtains the CID from the NAPT binding associated with that flow. For example, in a case of GRE-encapsulation with GRE-key extensions, translator element 30 adds the CID to a GRE key and sequence number extension of the GRE header, and then tunnels the flow to network element 20. Upon receiving a packet from the tunnel, translator element 30 obtains the CID from an incoming packet and, subsequently, uses it for performing a NAPT binding look up (and for performing the packet translation before forwarding the packet onto a next destination). Network element 20, upon receiving an IPv4 packet from access device 12, 14, looks up the softwire tunnel ID and/or the CID for that access device 12, 14. In the specific case of GRE encapsulation, network element 20 can (for example) add the CID to the GRE key and the sequence number extension of the GRE header and, subsequently, tunnel it to translator element 30.

Network element 20 subsequently obtains the CID from the received packet and uses the CID for making a forwarding decision. There can be an association between the CID and the forwarding state. When encapsulating an IPv4 packet, network element 20 and translator element 30 can employ a Diffserv Codepoint (DSCP) mechanism, or a multiprotocol label switching (MPLS) Traffic-Class Field in the case of MPLS.

Regarding softwire tunnel management and related considerations, in certain embodiments, there are various considerations related to the operational management of the tunnel between network element 20 and translator element 30. In one example, the softwire tunnel between network element 20 and translator element 30 is created at system startup time, where it would remain up and active. In some embodiments, network element 20 and translator element 30 can employ Operations Administrative and Management (OAM) mechanisms such as Internet Control Message Protocol (ICMP), bidirectional forwarding detection (BFD), or a label switched path (LSP) ping for tunnel health management and for corresponding protection strategies. In some embodiments, tunnel peers may be provisioned to perform policy enforcement, such as for determining the protocol type or the overall portion of traffic that is tunneled, or for any other quality of service related settings. The tunnel peers can have a proper understanding of the path maximum transmission unit (MTU) value. This can be statically configured at the tunnel creation time.

Figure 3:
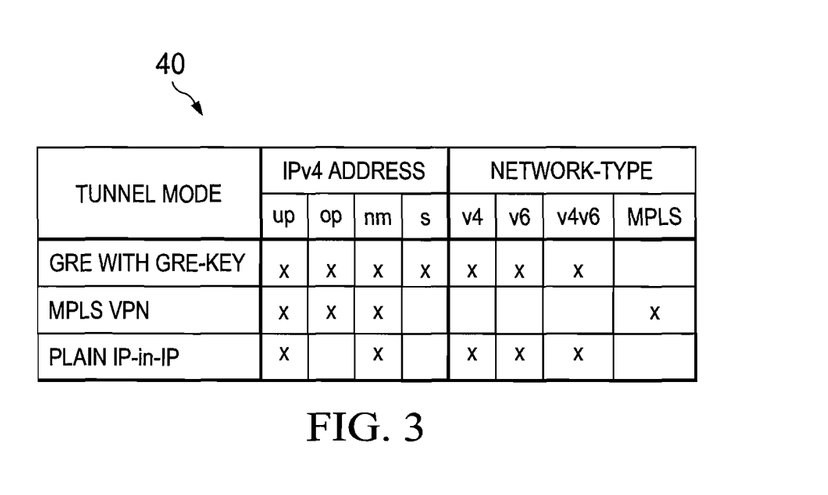
FIG. 3 is a simplified table depicting an overview of different tunnel modes associated with the communication system in accordance with one embodiment of the present disclosure.

Turning to FIG. 3, FIG. 3 illustrates a table 40 of different tunnel modes as they apply to different deployment scenarios between a network element and a translator element. Regarding tunnel modes, tunnels are deployment and requirement dependent, where different tunnel technologies can apply for connecting network element 20 and translator element 30. In various embodiments, GRE encapsulation with GRE key extensions, MPLS VPNs, or plain IP-in-IP encapsulation can be used. Softwire tunnel identification and context ID may depend on the tunneling technology employed. In various embodiments, the tunnel modes include:

A) GRE with GRE-key extensions: Softwire tunnel identification is supplied by the endpoints of the GRE tunnel. The GRE-key serves as the CID.

B) MPLS VPN: Tunnel identification is supplied by the VPN identifier of the MPLS VPN. The IPv4 address serves as CID. It is assumed that the IPv4 address within a VPN is unique.

C) Plain IPv4-in-IP: Tunnel identification is supplied by the endpoints of the IP-in-IP tunnel. The inner IPv4 address serves as CID. The IPv4 address is typically unique.

Regarding table 40, an "X" indicates that, in some embodiments, a certain deployment scenario is supported:

A) IPv4 address:
  i.) "up": Deployments with "unique private IPv4 addresses" assigned to the access devices are supported.
  ii.) "op": Deployments with "overlapping private IPv4 addresses" assigned to the access devices are supported.
  iii.) "nm": Deployments with "non-meaningful/dummy but unique IPv4 addresses" assigned to the access devices are supported.
  iv.) "s": Deployments where all access devices are assigned the same IPv4 address are supported.

B) Network-type
  i.) "v4": Gateway and AFTR are connected by an IPv4-only network.
  ii.) "v6": Gateway and AFTR are connected by an IPv6-only network.
  iii.) "v4v6": Gateway and AFTR are connected by a dual stack network, supporting IPv4 and IPv4.
  iv.) MPLS: Gateway and AFTR are connected by a MPLS network.

As is illustrated, a variety of tunnel modes can be supported between network element 20 and translator element 30.

Figure 4:
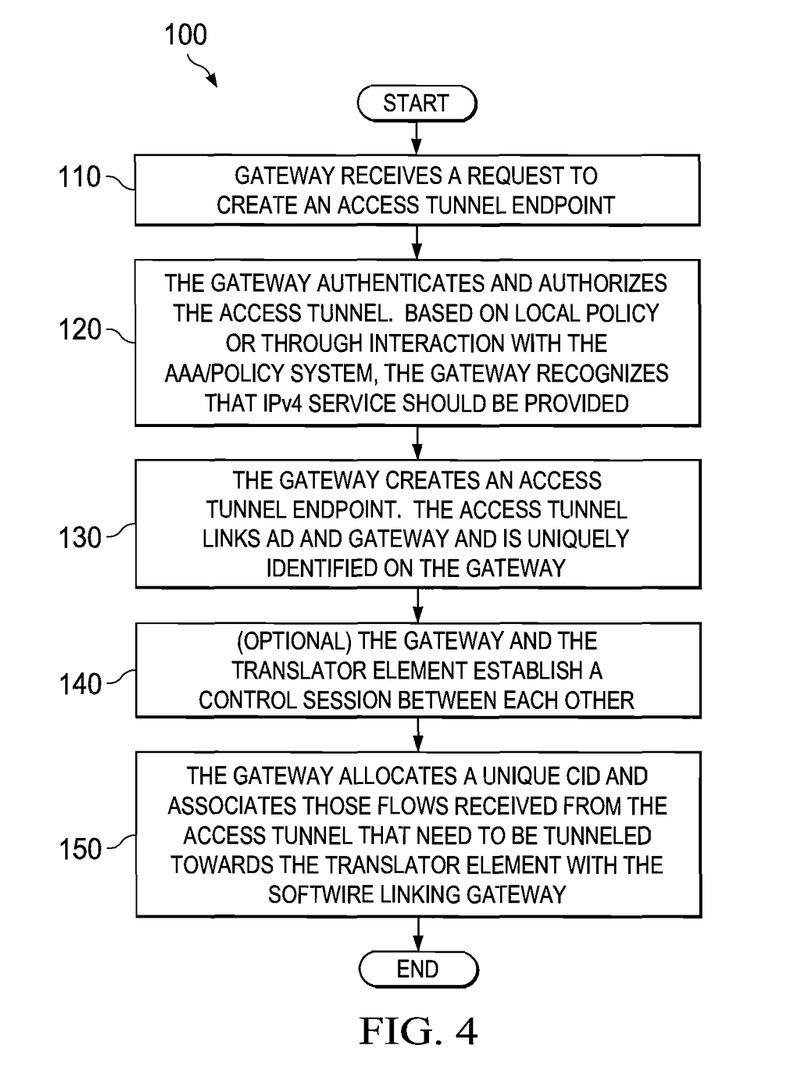
FIG. 4 is a simplified flow diagram illustrating details related to certain components of the communication system in a network environment in accordance with one embodiment of the present disclosure.

FIG. 4 is a simplified flowchart 100 illustrating details related to an example flow for communication system 10. Generally, an access device is in communication with a network element, such as a gateway. The network element is in communication with the (AAA)/policy module, and with a translator device, such as an AFTR or a similar NAPT device.

In step 110, a network element (e.g., a gateway) receives a request to create an access tunnel endpoint from an access device. At step 120, the network element authenticates and authorizes the access tunnel. Based on local policy (or through interaction with the AAA/Policy system), the network element recognizes that IPv4 service should be provided for the tunneling between the network element and a translating element.

At step 130, the network element creates an access tunnel for the access device (e.g., an endpoint). The access tunnel can link the access device and the network element and, further, it can be uniquely identified by a softwire tunnel ID on the network element. In step 140, the network element and the translator element establish a control session between each other. In step 150, the network element allocates a unique CID, and associates those flows received from the access tunnel that are to be tunneled toward the translator element. In one embodiment, a local forwarding policy on network element 20 determines the traffic to be tunneled toward translator element 30. Subsequently, the network element and the access device complete the access tunnel establishment. Depending on the procedures and mechanisms of the corresponding access network architecture, this step can include the assignment of an IPv4 address to the access device.

In terms of alternative embodiments and possible use cases, various network scenarios that use tunneling between a network element and a translator element can similarly be provisioned to achieve the operations discussed herein. In one embodiment, in a MIPv6-based network scenario, a mobile IPv6 home agent can implement translation module 24b of network element 20 when employing a mobile IPv6 functionality. Network element 20 can also be implemented in the mobile IPv6 home agent. In another embodiment, a local mobility anchor (LMA) can implement the functions of network element 20 (e.g., providing the tunnel termination for various types of access tunnels). Translator element 30 can also be implemented in the LMA when employing a PMIPv6 IPv4 support functionality. In yet another embodiment, a packet data network (PDN-Gateway)/Gateway GPRS Support Nodes (GGSN) includes the functions of translation module 24b of network element 20. In still yet another embodiment, translation module 24b of network element 20 can be used in an access service network (ASN) gateway, for example, in a fixed WiMAX architecture. In another embodiment, a home agent implements translation module 24b of network element 20, where a mobile WiMAX architecture is employed. In another embodiment, for a point to point (PPP)-based broadband access architectures, a Broadband Remote Access Server (BRAS) or a Broadband Network Gateway (BNG) implements translation module 24b and/or the functions of network element 20. In other embodiments for broadband access architectures using per-subscriber VLANs, the BNG can implement translation module 24b and/or the functionalities of network element 20.

Figure 5:
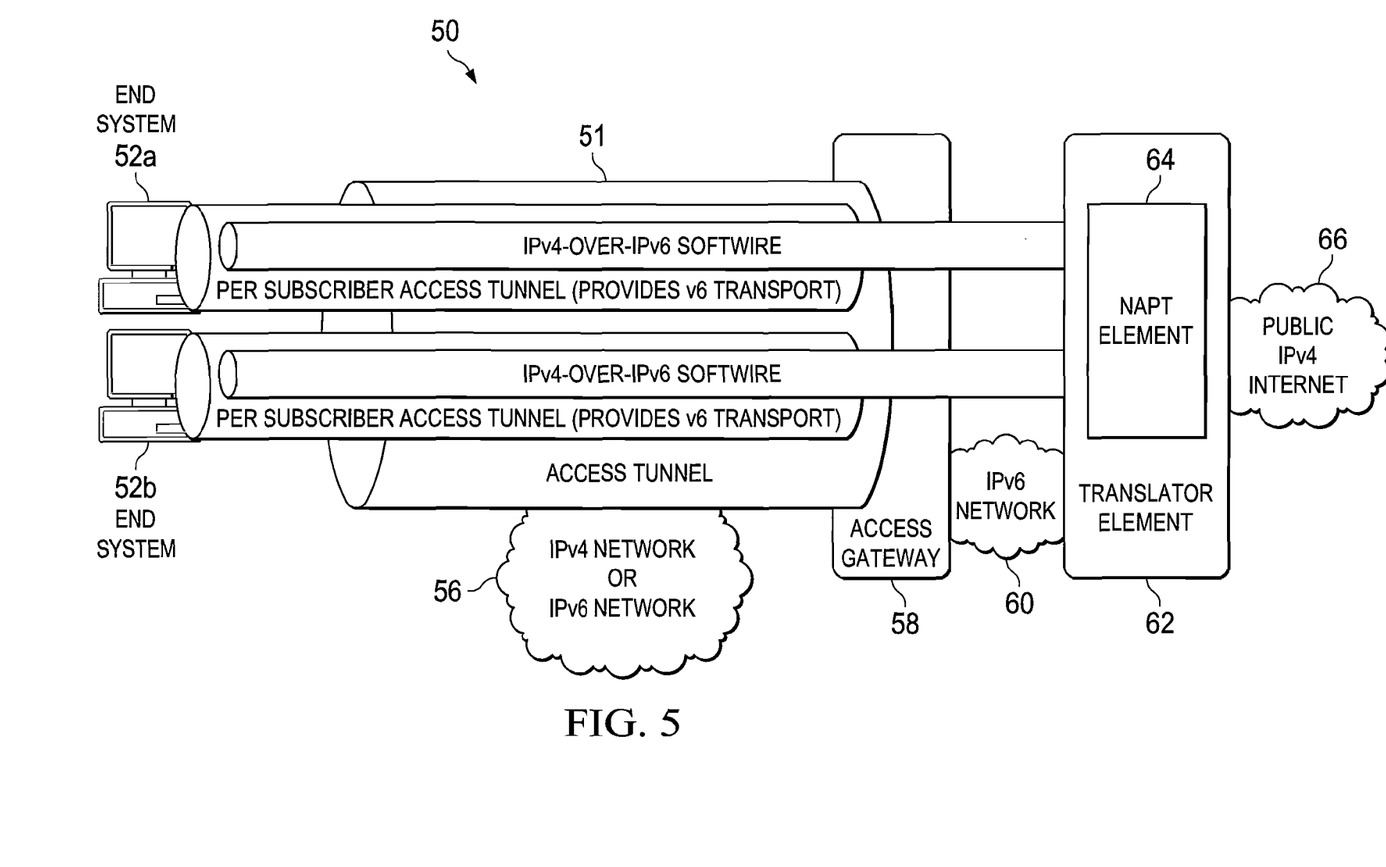
FIG. 5 is a simplified block diagram illustrating access tunnel from end systems to an access gateway.

Turning to FIG. 5, FIG. 5 illustrates a communication system 50 that uses tunnels from end systems to an access gateway. More specifically, FIG. 5 illustrates a simplified block diagram illustrating IPv4 and IPv6 access tunnels from end systems to an access gateway. In FIG. 5, communication system 50 includes a set of end systems 52a-b that can have connectivity to an IPv4 network 56 (or IPv6 network 56) and to an access gateway 58. A set of access tunnels 51 (e.g., instantiated per-subscriber) can exist between end systems 52a-b and access gateway 58. Also, between end systems 52a-b, though access gateway 58 and to a translator element device (e.g., a translator element 62), there are IPv4-over- IPv6 links (one example of a softwire), which is conveyed over an IPv6 network 60. The translator element includes a NAPT element 64, which binds various addresses and ports between IPv6 network 60 and a public IPv4 Internet 66. (Note that NAPT 44 (i.e., an IPv4-to-IPv4 NAPT) could be employed in this particular scenario of FIG. 5).

In order to have a NAPT that can accommodate both IPv6-IPv4 routing, such a mechanism would typically entail changes to end systems 52a-b. This would also commonly entail software tunneling being provided on top of access tunneling. For mobile networks, this would be added to the existing overhead on an air-link. Furthermore, in many systems, the access tunnel for the architecture may be defined only for IPv6 transport.

Figure 6:
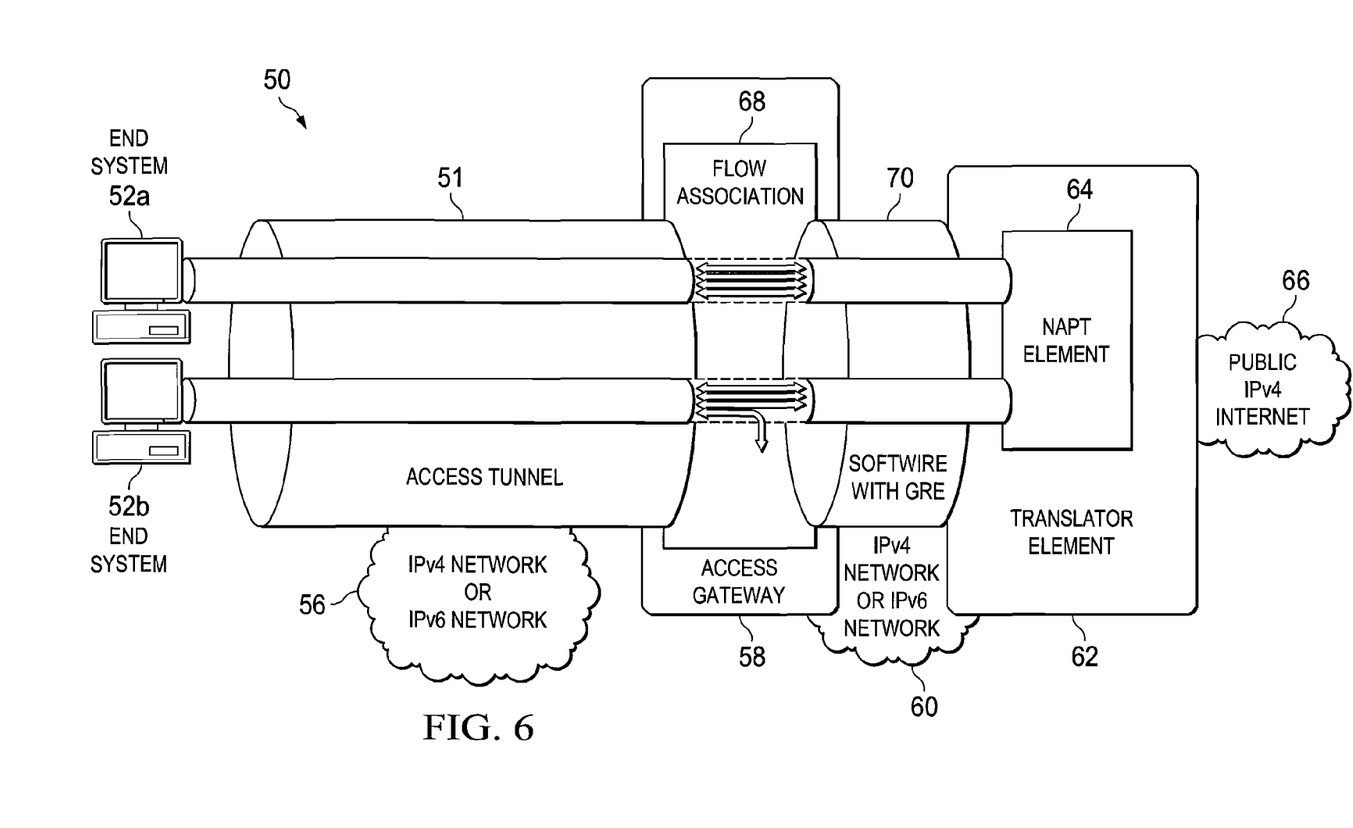
FIG. 6 is a simplified block diagram illustrating access tunnels between end systems and a network element associated with the communication system.

FIG. 6 is a simplified block diagram illustrating one implementation of communication system 10. This particular embodiment includes coupling two end systems to a network element through a flow association 68. A softwire with GRE encapsulation 70 is provided and it can traverse either an IPv4 or an IPv6 network. The packets of the softwire can be conveyed to the translator element, which can include aspects of a CGN, a NAPT mechanism, etc. Within this translator element, both the CID and the softwire tunnel ID are used to uniquely identify a flow, and that flow can be bound within devices such as translator element 62.

Note that the end system/user equipment (UE) and access architecture remain unchanged. This means that there is (in theory) no discernable impact on roaming operations. Furthermore, in some embodiments, when employing a point-to-point tunnel between the end system/UE and a NAPT functionality of translator element 30, the IPv4 addresses on the end system/UE are not used for packet forwarding between translator element 30 and the public IPv4 Internet. This can allow the networks of FIG. 6 to be either IPv4 or IPv6. Note that at least some of the flows of the gateway are not forwarded to a NAPT element for translation, which is depicted as dropped flows in FIG. 6.

Figure 7:
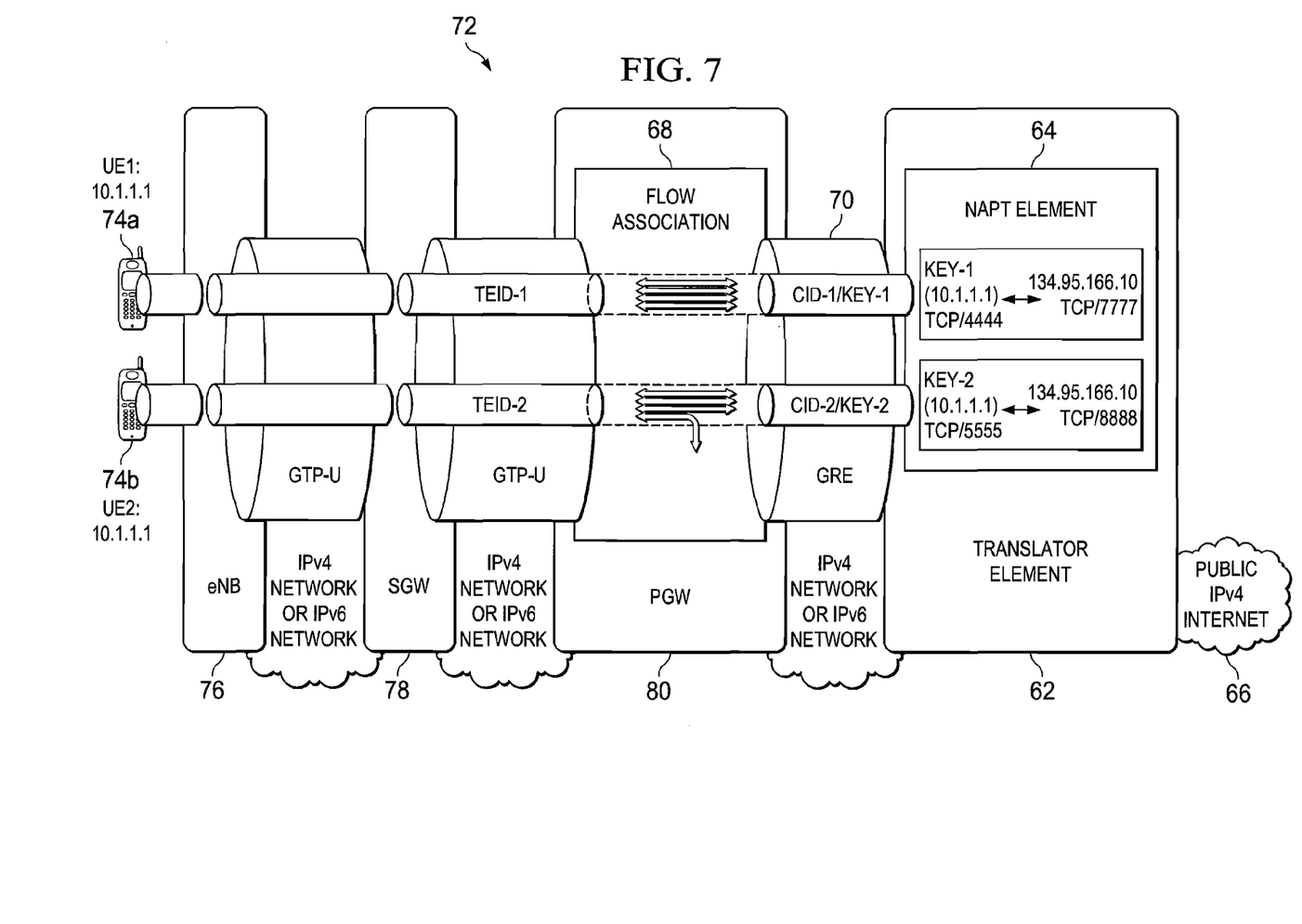
FIG. 7 is a another simplified block diagram illustrating access tunnels between user equipment and a network element associated with the communication system.

FIG. 7 is a simplified block diagram of a communication system 72 having user equipment (UE) 74a and 74b. Flows from these UEs 74a, 74b can traverse an evolved node B (eNB) 76 across an IPv4 or IPv6 network employing GTP-U tunneling protocol to a serving gateway (SGW) 78, which is a type of network element. These GTP tunnels can then be connected across serving gateway 78 to a packet gateway (PGW) 80, which are both types of network elements. PGW 80 can associate Evolved Packet Core (EPC) bearers (and a GGSN can associate PDP-contexts) to softwire tunnels. The context ID can identify individual flows. From PGW 80, the context ID and the softwire tunnel ID (e.g., embedded within the GRE key) can be communicated over an IPv4 network (or over an IPv6 network) to a translation element, which can have a NAPT function. Within the translation element, such as within a CGN, a mapping occurs between a softwire tunnel ID, context ID, port, etc. and a public IP address/port.

Figure 8:
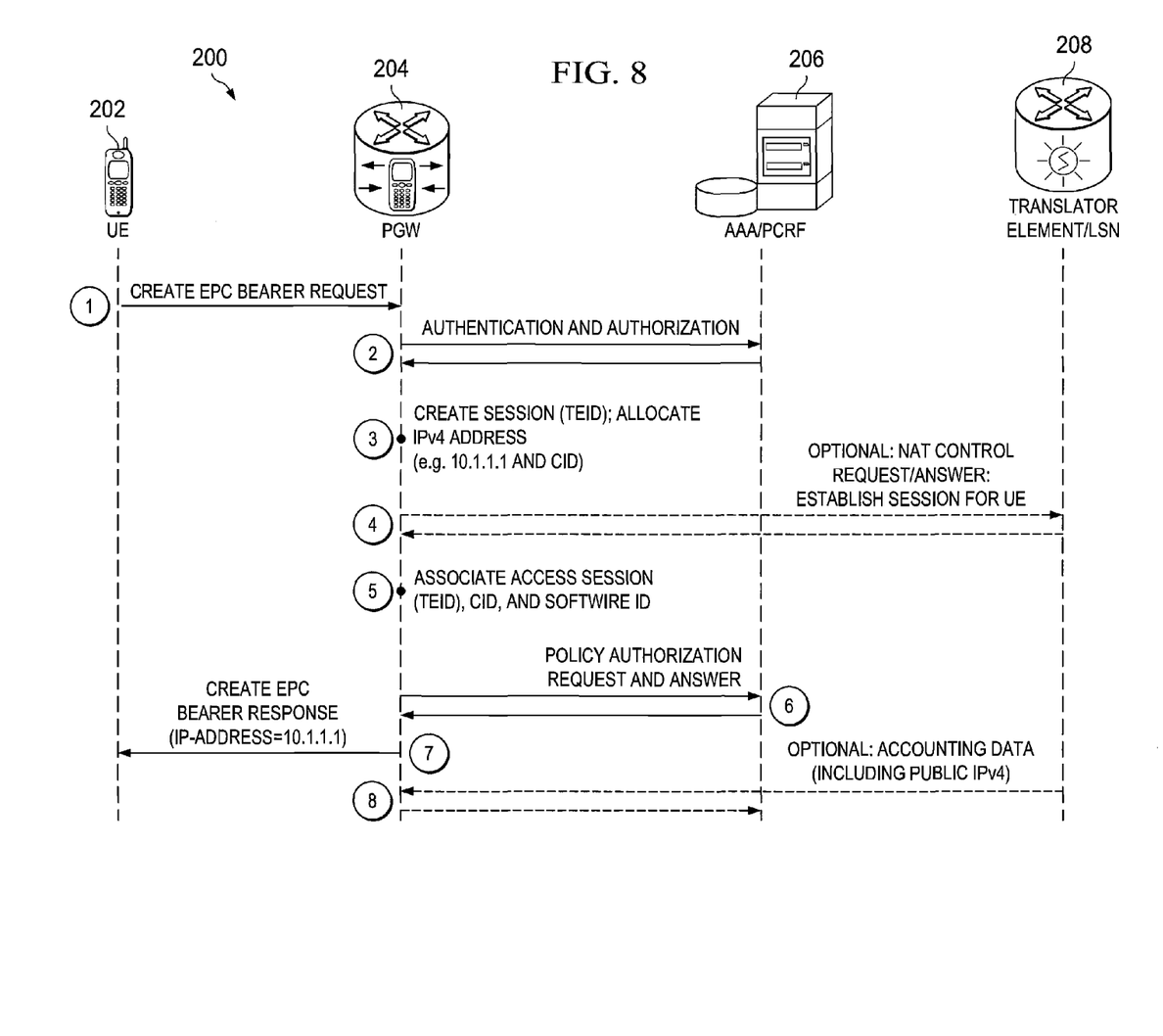
FIG. 8 is a simplified flow diagram illustrating details related to certain activities of a translation for the communication system in accordance with one embodiment of the present disclosure.

FIG. 8 illustrates an example flow diagram 200 of a gateway-initiated tunneling for IPv4. This particular flow may be inclusive of various functionalities of a CGN or a LSN. Generally, flow diagram 200 illustrates interactions between a UE 202, a PGW 204, an AAA/Policy and Charging Rules Function (PCRF) 206, and a translator element/LSN 208. Note that the translator element could readily be replaced by a digital subscriber line tunnel concentrator (DSLTC) in this example scenario.

In step 1 involving UE 202 and PGW 204, an EPC bearer request is created. In step 2, an authentication and authorization occurs between PGW 204 and AAA/PCRF 206. This authorization data enables a suitable translation for a subscriber. In step 3, a session is created, where a switch access session ID (e.g., a tunnel endpoint identifier (TEID)) is identified and where an IPv4 address is allocated. In step 4, a NAPT control request/answer involves PGW 204 and translator element/LSN 208. A session may be established for the UE on the translator element, where this operation forwards both the TEID and the CID. In step 5, PGW 204 determines the TEID, a CID, and the softwire tunnel ID. In step 6, a policy authorization request and answer occurs, and this involves PGW 204 and AAA/PCRF 206. In step 7, a policy response is created, and this involves PGW 204 and UE 202. In an optional step 8, accounting data is exchanged, which can include the public IPv4 address being exchanged between translator element/LSN 208 and PGW 204, and then between PGW 204 and AAA/PCRF 206.

Figure 9:
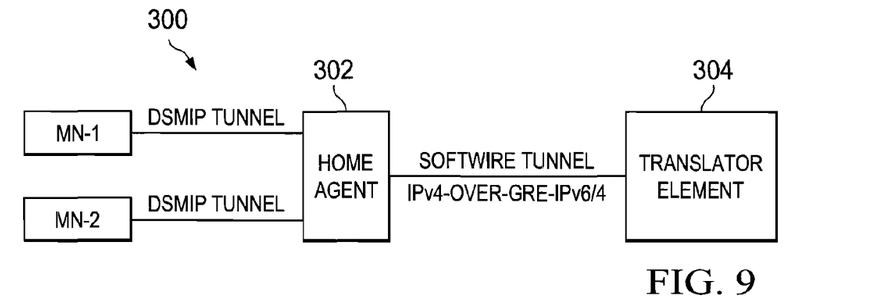
FIG. 9 is a simplified block diagram of a Dual-Stack Mobile IPv6 (DSMIPv6) deployment related to certain activities of the communication system in accordance with one embodiment of the present disclosure.

FIG. 9 illustrates one embodiment of a communication system 300 of a MIPv6 deployment that can operate according to the principles of the present disclosure. A home agent 302 can exchange both the context ID and the softwire tunnel ID with a translator element 304. Home agent 302 may register a unique CID with translator element 304 for any of the flows associated with a given mobile node. Communication system 300 offers a solution for those operators who seek to assign the same IPv4 private address to multiple mobile nodes within the scope of a single home agent 302. This can be advantageous due to the lack of availability of public or private IPv4 address space.

In one embodiment, the IPv4 address that home agent 302 assigns to a mobile node is unique within its scope, even when these assigned addresses are from a private IPv4 address space. In a further embodiment, when multiple home agents 302 share an overlapping private IPv4 address space, a NAPT translation occurs by bringing the NAPT from the edge of the network to deeper inside the operator network. In a specific embodiment, in the case of proxy mobile IPv6, a GRE key allows the assignment of overlapping private IPv4 addresses to mobile nodes in the hosted LMA model. However, in some embodiments, such an assignment does not occur within a single operator domain.

Figure 10:
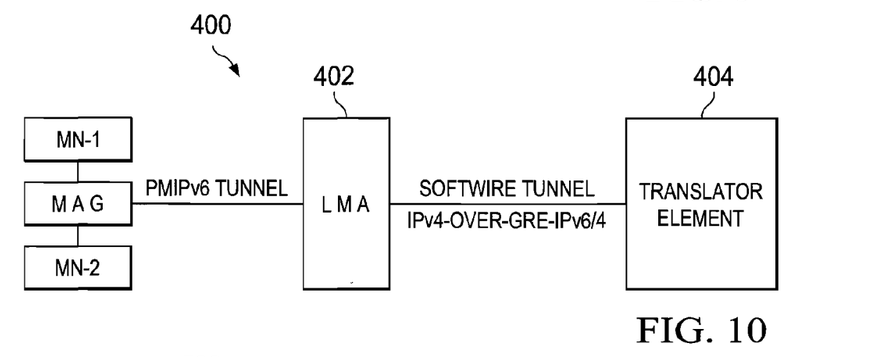
FIG. 10 is a simplified block diagram of a proxy mobile deployment related to certain activities of the communication system in accordance with one embodiment of the present disclosure.

Turning to FIG. 10, FIG. 10 illustrates a proxy mobile IP-based access architecture communication system 400, which can operate according to the principles of the present disclosure. In this embodiment, a local mobility anchor (LMA) 402 implements a gateway function along with a PMIPv6 IPv4 support functionality. LMA 402 may register a unique context ID with a translator element 404 for any of the flows associated with a given mobile node. LMA 402 can use the context ID as the key identifier for associating the two tunnels, the tunnel between the mobile access gateway and the local mobility anchor, and the tunnel between the local mobility anchor and translator element 404. It should be noted that a subset of the flows received over the PMIP initiated access tunnel can be forwarded/tunneled toward a given translator element.

Figure 11:
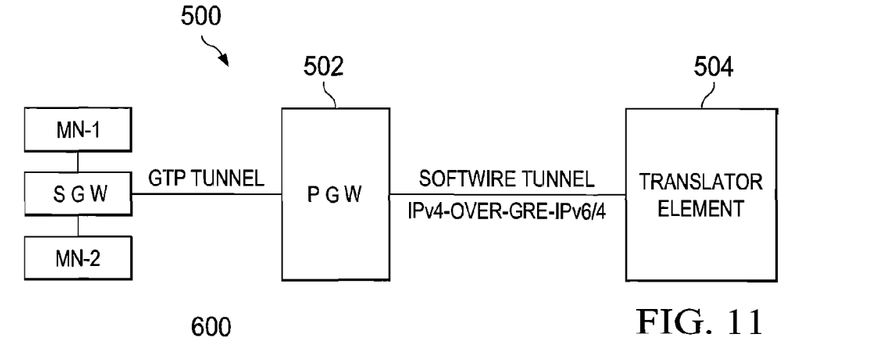
FIG. 11 is a simplified block diagram of another deployment related to certain activities of the communication system in accordance with one embodiment of the present disclosure.

FIG. 11 illustrates one embodiment of a GTP-based access architecture communication system 500, which can operate according the principles of the present disclosure. A PGW 502 can communicate with a translator element 504 over an IPv4-over-GRE-IPv6/4 implementation. In communication system 500, PGW 502 can include any form of a translation module, as discussed previously. PGW 502 can register a unique CID with translator element 504 for various flows associated with a given mobile node. PGW 502 can use the context ID as a key identifier for associating two tunnels: a) a tunnel between the SGW and PGW 502; and b) a tunnel between PGW 502 and translator element 504. In one embodiment, a GTP TEID could be leveraged as the CID. In the case of an IP-version agnostic access session (i.e., EPC bearer), the PDN gateway can differentiate IPv4 and IPv6 traffic. IPv4 traffic can be forwarded to (and received from) the softwire tunnel. IPv6, however, could be routed normally in particular embodiments.

Figure 12:
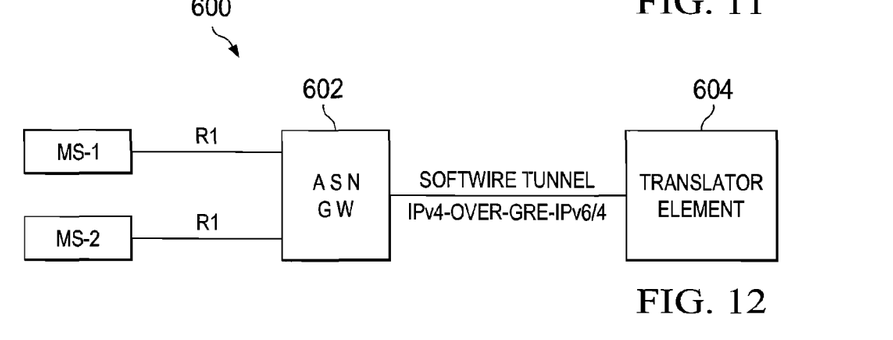
FIG. 12 is a simplified block diagram of a WiMAX protocol deployment related to certain activities of the communication system in accordance with one embodiment of the present disclosure.
Figure 13:
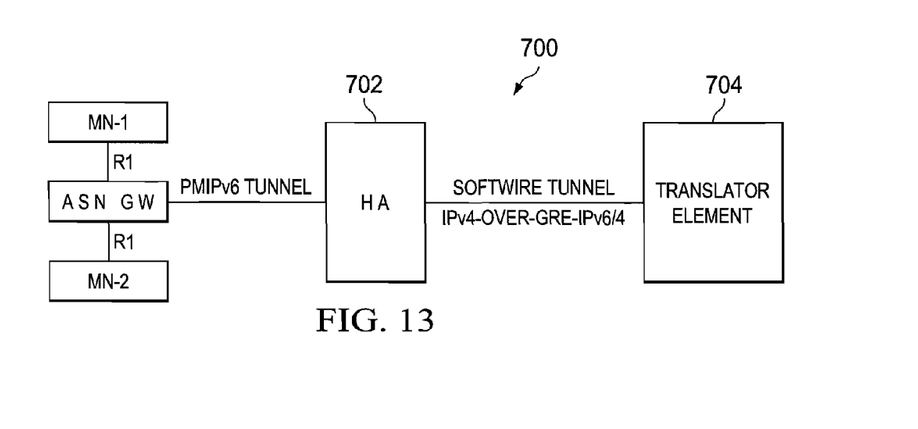
FIG. 13 is a simplified block diagram of a mobile WiMAX protocol deployment related to certain activities of the communication system in accordance with one embodiment of the present disclosure.
Figure 14:
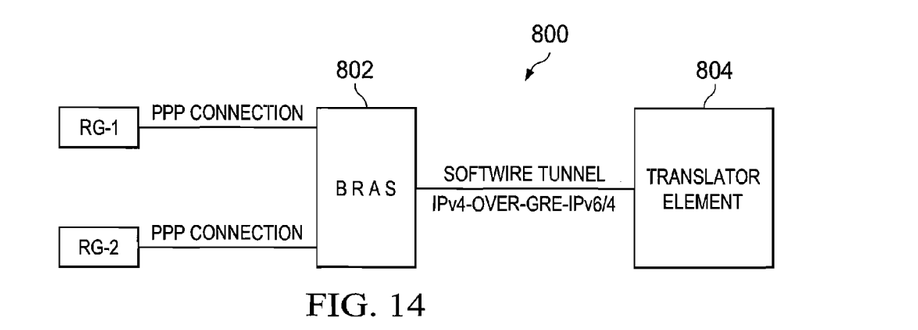
FIG. 14 is a simplified block diagram of a Point-to-Point protocol (PPP) deployment related to certain activities of the communication system in accordance with one embodiment of the present disclosure.

FIG. 12 illustrates one embodiment of a fixed Wi-Max access architecture communication system 600, which can operate according to the principles of the present disclosure. In communication system 600, an ASN gateway 602 communicates with a translator element 604 over IPv4-over-GRE-over-IPv6/4 tunneling. In this embodiment, ASN gateway 602 may register a unique CID with translator element 604 for any of the flows associated with a given mobile station. FIG. 13 illustrates one embodiment of a mobile WiMAX deployment of a communication system 700, which can operate according to the principles of the present disclosure. A home agent 702 is coupled to a translator element 704 using IPv4-over-GRE-IPv6/4. Home agent 702 can register a unique CID with translator element 704 for any of the flows associated with a given mobile system. FIG. 14 illustrates a communication system 800, which can operate according to the principles outlined herein. This particular embodiment is associated with a broadband access architecture, which leverages a Point-to-Point Protocol (PPP). Generally, PPP can be used to establish a point-to-point connection between an end system (e.g., a routing gateway (RG)) and the access gateway (e.g., a broadband remote access server (BRAS) 802 or a BNG). In one embodiment specific to PPP-based access architectures, a device that terminates the PPP-session (e.g., BRAS 802), can assume a role of the network element, as discussed herein.

A PPP connection can be identified through a virtual interface created on a BRAS 802. In the case of Point-to-Point Protocol over Internet (PPPoE), this can be achieved through the PPPoE session-identifier. The operator can choose to use a single PPP connection to provide connectivity for both IPv4 and IPv6, or the operator can deploy a PPP connection per-IP protocol version. The latter option can result in the establishment of two PPP connections per access device. In one embodiment, BRAS 802 registers a unique CID with a translator element 804 for a PPP access session. For deployments that use a single PPP session between a gateway (e.g., BRAS 802) and the access device (e.g., an RG), BRAS 802 differentiates IPv4 and IPv6 traffic. IPv4 traffic can be forwarded to (and received from) the softwire tunnel. IPv6 could be routed normally in such instances.

PPP access sessions can be identified through the virtual access interface created for each individual PPP session on the gateway, or (in case of PPPoE) through the PPPoE session ID (along with the source and destination MAC address). Assignment of the IPv4 address to the RGs could continue to use Internet Protocol Control Protocol (IPCP). Note that the IPv4 addresses being assigned to the RG do not necessarily have to be dummy addresses because the architecture(s) presented herein can allow the addresses to be fully qualified public or private addresses. Alternatively, the IPCP phase could be omitted, where IPv4 addresses could be configured through an out-of-band process.

Figure 15:
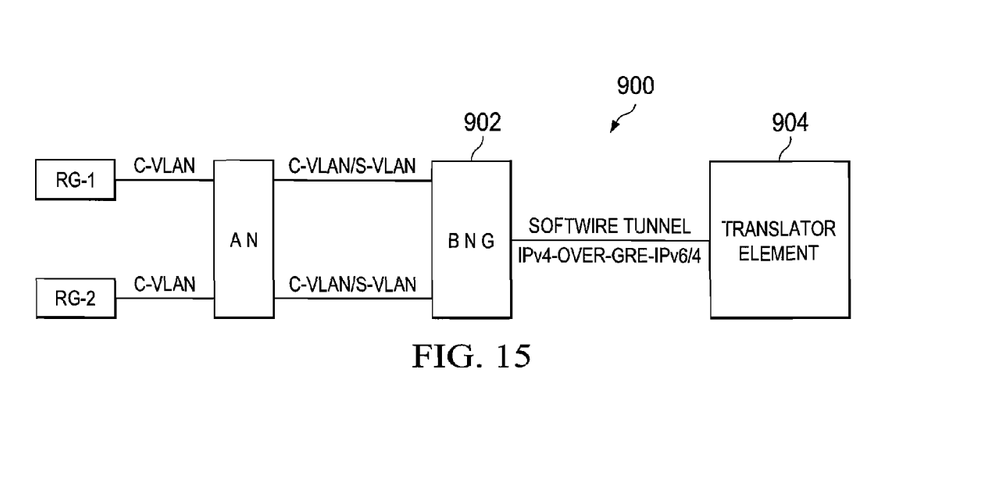
FIG. 15 is a simplified block diagram of an Ethernet access deployment related to certain activities of the communication system in accordance with one embodiment of the present disclosure.

Turning to FIG. 15, FIG. 15 illustrates an Ethernet VLAN communication system 900, which can operate according to the principles of the present disclosure. A BNG 902 is coupled to a translator element 904 over IPv4-over-GRE-over-IPv6/4 tunneling. In one embodiment, end systems (e.g., routing gateways [RG1 and RG2]) are connected through access nodes (AN) to the gateway (e.g., BNG 902). In one embodiment, communication network 900 uses point-to-point VLANs between a routing gateway and BNG 902. The point-to-point VLAN can assume a role of the generic, per-end system access tunnel. In some embodiments, the combination of S-VLAN and C-VLAN uniquely identify the connections involving the routing gateways.

In one embodiment, BNG 902 registers a unique CID with translator element 904 for an access session. Access sessions can be identified by the S-VLAN and C-VLAN tags. For deployments that use a single VLAN between a gateway (i.e., BNG 902) and the access device (e.g., RG1) carrying both IPv4 and IPv6 traffic, BNG 902 can differentiate IPv4 and IPv6 traffic (e.g., based on Ethertype). In some embodiments, IPv4 traffic is forwarded to (and is received from) the softwire tunnel. IPv6 can be routed normally in certain embodiments. Assignment of the IPv4 address to the RGs can use a dynamic host configuration protocol (DHCP). Alternatively, the dummy IPv4 address could be configured through an out-of-band process. If used, a DHCP server can differentiate between requests from clients that have translation capabilities (as described in the present disclosure for which only an IPv4 address would be assigned) and other clients, which do not have such translation capabilities.

Note that in certain example implementations, the translation functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, network element 20 and translator element 30 include software in order to achieve the address management functions outlined herein. These activities can be facilitated by access devices 12, 14, network element 20, and/or translator element 30. Access devices 12, 14, network element 20, and/or translator element 30 can include memory elements for routing to be used in achieving the intelligent address management, as outlined herein. Additionally, access devices 12, 14, network element 20, and/or translator element 30 may include a processor that can execute software or an algorithm to perform the address management activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term "memory element." Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate any number of devices or flows, as well as more complicated/sophisticated arrangements and configurations. Accordingly, the examples provided herein should not limit the scope or inhibit the broad teachings of communication system 10 as potentially applied to a myriad of other architectures.

It is also important to note that the steps discussed with reference to FIGS. 1-15 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. Virtually any configuration that seeks to intelligently control network traffic could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
   receiving, by a gateway, a request from an access device to create an access tunnel that extends between the access device and the gateway;
   creating, by the gateway, the access tunnel, wherein the access tunnel carries network flows of more than one Internet Protocol;
   registering, by the gateway, a flow identifier associated with the access device with a translator element, wherein the flow identifier associates the access tunnel with a tunnel created at system startup that selectively extends from the gateway to a next destination associated with the translator element; and
   routing, by the gateway, a network flow using the flow identifier when the network flow is associated with an Internet Protocol version that qualifies for network address and port translation.

2. The method of claim 1, wherein the routing includes forwarding the flow identifier with a network flow received from the access device to the translation element for network address and port translation.

3. The method of claim 1, wherein further including, wherein
   the flow identifier and a tunnel identifier associated with the tunnel that extends between the gateway and the translator element are mapped to an Internet protocol (IP) address associated with the network flow.

4. The method of claim 3, wherein:
   the tunnel identifier includes endpoints of a GRE tunnel; and
   the flow identifier is a GRE-key.

5. The method of claim 3, wherein:
   the tunnel identifier includes a virtual private network (VPN) identifier of a multiprotocol label switching (MPLS) VPN; and
   the flow identifier is an IP address associated with the network flow.

6. The method of claim 3, wherein:
   the tunnel identifier includes endpoints of an IP-in-IP tunnel; and
   the flow identifier is an inner IP address.

7. The method of claim 1, further including assigning a same IP address to network flows associated with more than one access device, wherein the IP address is associated with an Internet Protocol that qualifies for network address and port translation.

8. One or more non-transitory media encoded with that includes code for execution and when executed by a processor operable to perform operations comprising:
   receiving, by a gateway, a request from an access device to create an access tunnel that extends between the access device and the gateway;
   creating, by the gateway, the access tunnel, wherein the access tunnel carries network flows of more than one Internet Protocol;
   registering, by the gateway, a flow identifier associated with the access device with a translator element, wherein the flow identifier associates the access tunnel with a tunnel created at system startup that selectively extends from the gateway to a next destination associated with the translator element; and
   routing, by the gateway, a network flow using the flow identifier when the network flow is associated with an Internet Protocol version that qualifies for network address and port translation.

9. The non-transitory media of claim 8, wherein the routing includes forwarding the flow identifier with a network flow received from the access device to the translation element for network address and port translation.

10. The non-transitory media of claim 8, wherein the more than one Internet Protocol includes a first Internet Protocol and a second Internet Protocol that qualifies for network address and translation, wherein the logic is operable to perform operations further including:
    when the network flow is associated with the first Internet Protocol, routing the network flow using an IP address associated with the first Internet Protocol; and
    when the network flow is associated with the second Internet Protocol, routing the network flow using a tunnel identifier associated with the tunnel that extends between the gateway and the translator element and the flow identifier.

11. The non-transitory media of claim 8, wherein
    the flow identifier and a tunnel identifier associated with the tunnel that extends between the gateway and the translator element are mapped to an Internet protocol (IP) address associated with the network flow.

12. The non-transitory media of claim 8, operable to perform operations further including assigning a same IP address to network flows associated with more than one access device, wherein the IP address is associated with an Internet Protocol that qualifies for network address and port translation.

13. An apparatus comprising:
a memory element configured to store data;
a processor operable to execute instructions associated with the data; and
wherein the processor and memory element cooperate such that a gateway is configured to:
  receive a request from an access device to create an access tunnel that extends between the access device and the gateway;
  create the access tunnel, wherein the access tunnel carries network flows of more than one Internet Protocol;
  register a flow identifier associated with the access device with a translator element, wherein the flow identifier associates the access tunnel with a tunnel created at system startup that selectively extends from the gateway to a next destination associated with the translator element; and
  route a network flow using the flow identifier when the network flow is associated with an Internet Protocol version that qualifies for network address and port translation.

14. The apparatus of claim 13, wherein the routing the includes forwarding the flow identifier with a network flow received from the access device to the translation element for network address and port translation.

15. The apparatus of claim 13, wherein
the flow identifier and a tunnel identifier associated with the tunnel that extends between the gateway and the translator element are mapped to an Internet protocol (IP) address associated with the network flow.

16. The apparatus of claim 13, further configured to assign a same IP address to network flows associated with more than one access device, wherein the IP address is associated with an Internet Protocol that qualifies for network address and port translation.

17. The apparatus of claim 13, wherein the more than one Internet Protocol includes a first Internet Protocol and a second Internet Protocol that qualifies for network address and translation, wherein the apparatus is further configured to:
  when the network flow is associated with the first Internet Protocol, route the network flow using an IP address associated with the first Internet Protocol; and
  when the network flow is associated with the second Internet Protocol, route the network flow using a tunnel identifier associated with the tunnel that extends between the gateway and the translator element and the flow identifier.

* * * * *